United States Patent Office 3,152,530
Patented Oct. 13, 1964

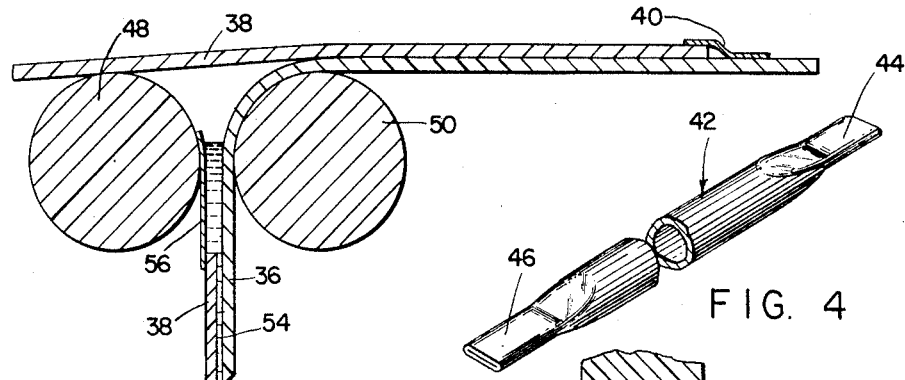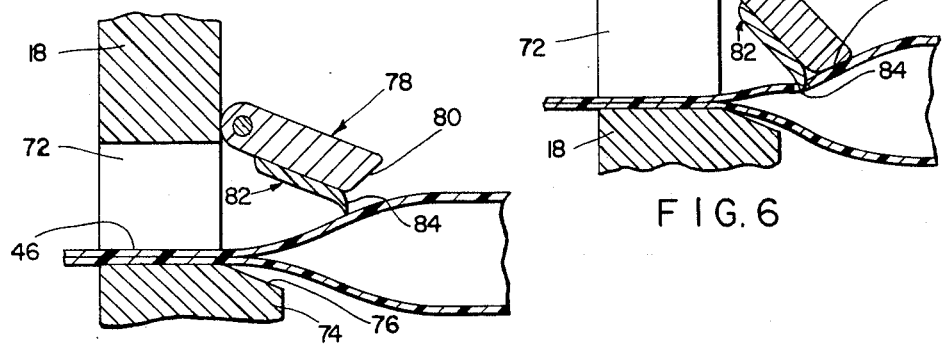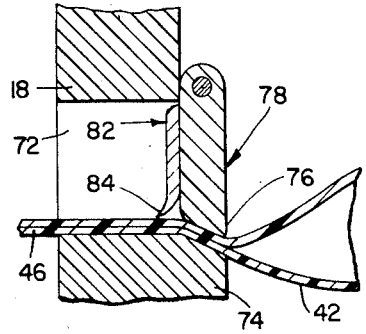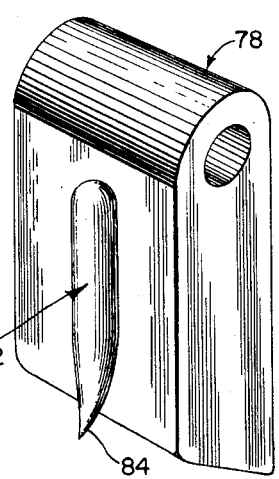

3,152,530
PHOTOGRAPHIC APPARATUS
Vaito K. Eloranta, Needham, Mass., assignor to Polaroid Corporation, Cambridge, Mass., a corporation of Delaware
Filed Sept. 10, 1962, Ser. No. 223,294
8 Claims. (Cl. 95—13)

This invention relates to photographic apparatus and particularly to novel apparatus for exposing and thereafter processing a succession of photosensitive sheets.

The present invention is concerned with photographic apparatus of the general type disclosed in the copending U.S. patent application of Irving Erlichman, Serial No. 48,666, filed August 10, 1960, in which a succession of individual photosensitive sheets are attached to the same carrier sheet, and each photosensitive sheet is moved from superposed position with an area of the carrier sheet into position for exposure, is exposed, and is thereafter superposed with another area of the carrier sheet while a liquid processing composition is distributed between the exposed photosensitive sheet and the area of the carrier sheet superposed therewith. Each of the photosensitive sheets is generally rectangular in shape, is hinged or otherwise pivotally secured at one transverse edge to the carrier sheet and, during its manipulation within the apparatus, is pivoted with respect to the carrier sheet through 180° so that the surface of the photosensitive sheet initially facing the carrier sheet prior to exposure faces away from the carrier sheet at the termination of processing.

The invention has for objects the provision of photographic apparatus of the character described in the form of a camera having an inexpensive, compact construction; and a camera for exposing a succession of photosensitive sheets substantially to their lateral edges and including novel and improved means for manipulating the photosensitive sheets and locating them in position for exposure.

Another object of the invention is to provide apparatus of the type described including means for severing the carrier sheet coupled with the means for locating the photosensitive sheets in position for exposure.

Other objects of the invention will in part be obvious and will in part appear hereinafter.

The invention accordingly comprises the apparatus possessing the construction, combination of elements and arrangement of parts, which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is an enlarged sectional view illustrating the operation of the camera and the construction of photographic materials useful therein;

FIG. 4 is a fragmentary perspective view of a container useful in the apparatus;

FIGS. 5, 6 and 7 are enlarged sectional views illustrating the operation of the invention; and FIG. 8 is a perspective view showing a component of the apparatus.

Figure 1:
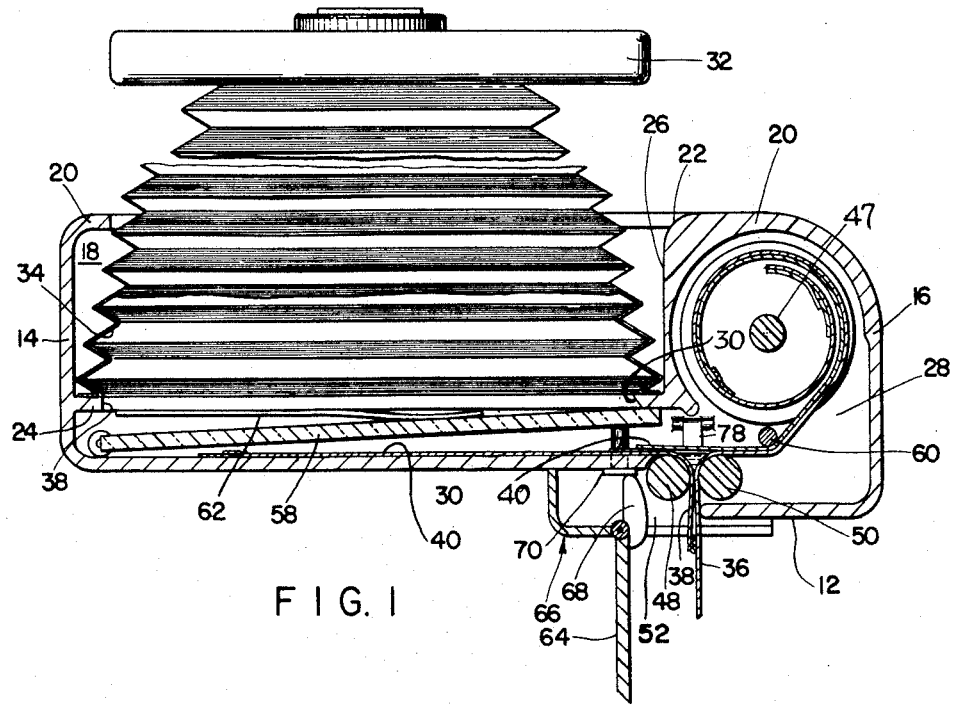
FIGURE 1 is a sectional view taken midway between the sides of photographic apparatus in the form of a camera embodying the invention.
Figure 2:
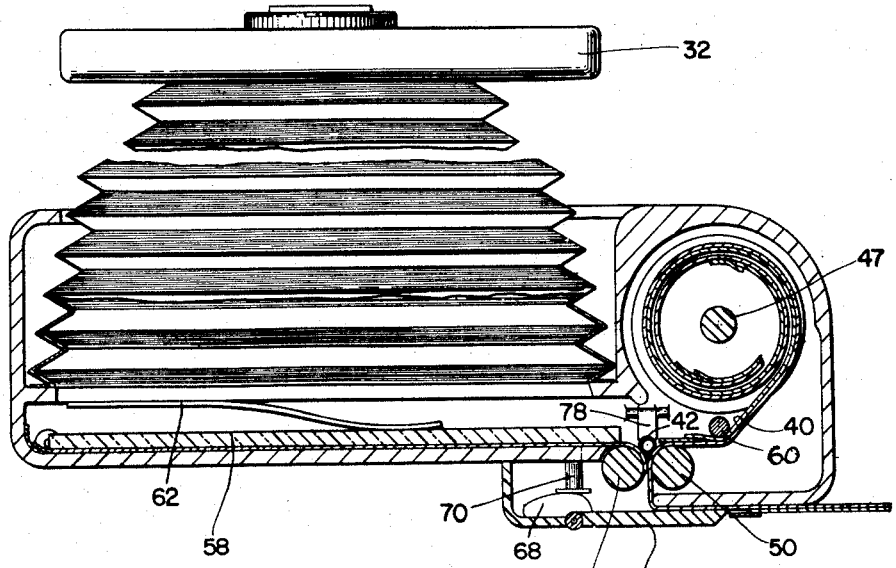
FIG. 2 is a view similar to FIGURE 1 illustrating another operative position of the apparatus.

Reference is now made to FIGS. 1 and 2 of the drawings wherein there is illustrated photographic apparatus in the form of a hand-held camera embodying the invention. The camera, designated 10, comprises a housing including a rear wall 12, end walls 14 and 16, side walls 18 and a forward wall 20 having an opening 22. The housing also includes an inner forward wall 24 joined at three sides to side walls 18 and end wall 14, and at one side to an intermediate end wall 26 which is joined to inner forward wall 24, side walls 18 and forward wall 20 at one side of opening 22. Intermediate end wall 26 cooperates with end wall 16, forward wall 20 and side walls 18 to define a storage chamber 28 at one end of the camera housing. Inner forward wall 24 is located adjacent and substantially parallel with rear wall 12 and cooperates with the rear wall to define an exposure chamber. Inner forward wall 24 is provided with an aperture 30 for admitting light to the exposure chamber.

The camera includes a conventional lens and shutter assembly designated 32 coupled with the camera by a folding bellows 34 joined to the shutter assembly and to inner forward wall 24 in the periphery of aperture 30. A suitable erecting system (not shown) is provided for supporting the lens and shutter assembly in the operative position shown while permitting assembly 32 to be retracted into the housing within opening 22 in forward wall 20.

Camera 10 is designed to expose and process a succession of areas of photosensitive sheet material to produce a succession of positive photographic prints. In order to achieve a construction which is small, compact and inexpensive yet capable of producing relatively large prints, it is advantageous to employ photographic sheet material in roll form particularly in the form of a single roll or coil; to expose the photosensitive sheet to its edges in order to conserve both space and photosensitive materials; and to supply and distribute the processing liquid in such a way as to simplify the means required to perform these operations. Exposing the photosensitive material to its edges, e.g., two lateral and one transverse, presents a number of problems relating to the design and construction of both the sheet materials and the means in the camera for manipulating the sheet materials particularly when it is a prerequisite that the construction of the expendable materials also be simple and hence inexpensive.

Reference is now made to FIGS. 1 through 3 of the drawings in which there is illustrated a photographic film assemblage characterized by a construction which is simple and inexpensive while providing for the production of a plurality of relatively large photographic prints in apparatus which meets the criteria discussed. The film assemblage comprises an elongated carrier sheet 36 at least equal in width to the width of the photographic images to be produced in and by the apparatus, and is formed of a flexible sheet material, such as paper, which is or may be rendered opaque to actinic light. The film assemblage is provided in a roll form and includes a plurality of individual photosensitive image-recording sheets 38 each generally rectangular in shape and attached to carrier sheet 36. Each of the image-recording sheets 38 includes a layer of a photosensitive image-recording material such as a silver halide emulsion, carried on a supporting sheet of a conventional film base material such as paper which is opaque to light actinic to the photosensitive material. The image-recording sheets are each substantially equal in width to the width of the photographic image to be produced thereon and are secured in succession to carrier sheet 36 with the rear surface of each image-recording sheet i.e., the surface opposite the photosensitive layer, located in face-to-face contact with the second sheet. Each of the image-recording sheets is secured to the carrier sheet at one edge, termed its trailing edge, by means such as a hinge 40 which permits the image-recording sheet to be pivoted about its trailing edge with respect to the carrier sheet through 180° so that the photosensitive layer of the image-recording sheet faces the carrier sheet.

The sheets are initially provided in a coiled condition on a spool with the image-recording sheets coiled innermost and with the hinged trailing ends of the image-recording sheets disposed toward the trailing end of the carrier sheet so that the free leading edges of the image-recording sheets are withdrawn from the coil first.

The camera shown is designed to expose an area of each image-recording sheet extending to the lateral edges thereof and thereby take the fullest possible advantage of the available photosensitive material. The camera is also preferably designed to expose the image-recording sheet to the leading edge thereof and to hinge 40 which is made as small as possible in order to achieve the fullest possible utilization of the photosensitive material. The film construction shown and the particular novel construction of the camera make it possible to manipulate the individual photosensitive sheets in such a way as to expose the photosensitive sheets to at least three edges and then to process the exposed photosensitive sheets, all of which is accomplished in a camera characterized by a small, compact and relatively simple construction.

Processing of each exposed photosensitive sheet, preferably to produce a positive transfer print on the carrier sheet by a silver halide diffusion-transfer reversal process, is accomplished by superposing the photosensitive layer of each image-recording sheet with a surface of carrier sheet 36 and distributing a viscous processing liquid between the two sheets by advancing the sheets between a pair of juxtaposed pressure-applying members. The processing liquid, in the form shown, is provided initially in an elongated tubular container, designated 42 in FIG. 4. Container 42 is shaped very much like a conventional drinking straw, has a rounded cross section which is substantially uniform throughout the length of the container and is formed of a material which is air and water impervious and inert to the processing liquid; organic plastics, metal foils and multi-ply materials including plastic, paper and metal foils being suitable for this purpose. The container is sealed at one end, termed trailing end 44, in such a way as to become unsealed in response to hydraulic pressure generated within the liquid contents of the container to thereby provide a mouth substantially equal in area to the cross sectional area of the fluid-filled portion of the container, and the liquid contents of the container are discharged through this mouth. The leading end, designated 46, of the container is sealed in a similar manner by flattening the container, and a flattened portion is provided of sufficient length to permit it to be grasped manually.

The liquid contents of the container are dispensed therefrom onto one of the sheets in the form of an elongated uniformly distributed mass extending from side to side of the area of the sheet to be treated with the liquid. This is accomplished by introducing container 42 into the apparatus so that it is positioned closely adjacent one or both of the sheets at an edge of an area thereof to be treated, with the fluid-filled portion of the container extending substantially from side to side of this area. The container is then withdrawn in the direction of its elongation toward leading end 46 while the container is being compressed progressively from its leading end toward its trailing end to open the trailing end of the container and eject the fluid contents thereof onto one or both of the sheets. The dispensation of the processing liquid from the container onto the sheets is thus accompanied by ridding the sheets of the container so that the apparatus which subsequently distributes the processing liquid in a layer between the two sheets is not required to accommodate the thickness of the container.

The film assemblage, comprising carrier sheet 36 and a plurality of image-recording sheets 38, is preferably coiled on a spool 47 the ends of which function to prevent exposure of the individual image-recording sheets as the film assembly is loaded into storage chamber 28 of the camera, the latter being constructed to provide access for loading. The means for distributing the processing liquid between the sheets comprises a pair of juxtaposed pressure-applying members shown in the form of cylindrical rolls 48 and 50 mounted in the rear of chamber 28 in alignment with an opening 52 therein through which the image-recording and carrier sheets may be withdrawn. Roll 48 is mounted for rotation in a fixed position, and roll 50 may be mounted for movement toward and away from roll 48 and is urged toward roll 48 by a suitable spring (not shown) which may be housed in the rear of chamber 28. The means for mounting roll 50, also housed within chamber 28, preferably provides for spacing the rolls a fixed minimum distance apart, this distance being approximately equal to the combined thicknesses of carrier sheet 36, image-recording sheet 38 and the layer 54 of liquid to be distributed therebetween by withdrawing the sheets between rolls 48 and 50 from the camera through opening 52. In order to insure the spreading of the liquid to the lateral edges of the sheets, the liquid supplied for processing each image-recording sheet is generally in excess of the amount required so that provision is made for collecting and retaining this excess liquid and preventing it from coming into contact with roll 48. In the form shown, these means comprise a trapping sheet 56 of a material which is substantially thinner than the material comprising photosensitive sheet 38 attached to the leading end of each photosensitive sheet. Since the minimum gap between rolls 48 and 50 is approximately equal to the combined thickness of carrier sheet 36, image-recording sheet 38 and layer 54, as trapping sheet 56 passes between rolls 48 and 50, a space is provided between the trapping sheet and the carrier sheet in which any excess processing liquid collects and is retained.

The apparatus includes means for holding each successive image-recording sheet against the forward surface of rear wall 12 in position for exposure substantially at the focal surface of the lens of assembly 32. These means must also permit exposure of the image-recording sheet to its lateral edges and substantially to its end (transverse) edges and, in the form shown, comprise a clamping plate 58 having substantially parallel surfaces at least coextensive with the area of the image-recording sheet to be exposed and formed of a transparent material such as glass or organic plastics. Clamping plate 58 is positioned between rear wall 12 and intermediate wall 26 and is mounted for pivotal movement toward and away from rear wall 12 between an inoperative position shown in FIGURE 1 and an operative position shown in FIG. 2. Plate 58 and rear wall 12 in the inoperative position cooperate to form a convergent passage into which each image-recording sheet is introduced and within which each image-recording sheet is thereafter clamped in position for exposure.

In the operation of the apparatus, carrier sheet 36 extends from the coil on spool 47 within chamber 28 between rolls 48 and 50 from the camera. Withdrawal of the carrier sheet causes the leading end of a leading edge of an image-recording sheet, attached to the carrier sheet, to advance into the convergent passage provided between rear wall 12 and clamping plate 58. To insure movement of the leading edge of the carrier sheet in the correct direction between plate 58 and rear wall 12, a guide member 60 is provided within chamber 28 adjacent roll 50. The withdrawal movement of the carrier sheet is continued until the image-recording sheet is in position for exposure whereupon movement of the carrier sheet and image-recording sheet is discontinued. Hinges 40, in the construction shown, function to indicate to the operator that an image-recording sheet is in position for exposure so that the operator may discontinue withdrawal movement of the carrier sheet. This indication is an abrupt increase in the force required to withdraw the carrier sheet between the pressure rolls due to the added thickness of the hinge which is folded upon itself as it enters the bite of the rolls. Clamping plate 58 is then allowed to pivot rearwardly under the bias of springs 62 mounted on inner forward wall 24 and disposed in engagement with the lateral edges of the clamping plate, to the operative position in which the image-recording sheet is clamped between plate 58 and rear wall 12. Following exposure of the image-recording sheet, a quantity of processing liquid is dispensed between the image-recording and the carrier sheet where the two sheets are joined at the bite of rolls 48 and 50. The carrier sheet, hinge, and photosensitive sheet are then withdrawn between the rolls simultaneously distributing the processing liquid between the exposed image-recording sheet and carrier sheet while advancing the next succeeding image-recording sheet into exposure position between plate 58 and rear wall 12. The exposed image-recording sheet is superposed and processed in conjunction with an area of the carrier sheet which is superposed with the next succeeding image-recording sheet. Withdrawal of the carrier sheet is continued until the next succeeding image-recording sheet is in position for exposure and the hinge thereof has entered the bite of the rolls.

The camera includes means for severing the carrier sheet at the trailing edge of each trapping sheet 56 so that the exposed photosensitive sheet may be separated from the carrier sheet containing a transfer print when processing and print formation have been completed. These means comprise a cutter bar 64 in the form of a flat plate pivotally mounted adjacent one edge within an auxiliary housing 66 provided on rear wall 12 and cooperating with the rear wall to provide opening 52. Cutter bar 64 is pivotable between the open position shown in FIGURE 1 in which opening 52 is unobstructed and the closed position shown in FIG. 2 in which the cutter bar extends across opening 52 in closing relation thereto and in juxtaposition with a portion or rear wall 12 adjacent opening 52. In the closed position of the cutter bar, a portion of carrier sheet 36 is clamped between the cutter bar and rear wall 12; and the former is provided with a sharpened edge against which the carrier sheet may be drawn to sever the carrier sheet. The portion of the carrier sheet clamped between rear wall 12 and the cutter bar thereafter functions as a leader by which the carrier sheet may be grasped to withdraw the next succeeding image-recording sheet between pressure-applying rolls 48 and 50 when the cutter bar is moved to its open position.

Since the cutter bar must be opened in order to grasp and withdraw the carrier sheet, and clamping plate 58 must be pivoted to its inoperative position to permit an exposed image-recording sheet to be withdrawn while the next succeeding image-recording sheet is advanced into position for exposure, the cutter bar is coupled with the clamping plate so that operation of the cutter bar also operates the clamping plate. The coupling means shown comprise a pair of cams 68 mounted on the cutter bar and pivotable therewith, and cam follower pins 70 extending from the outside of rear wall 12 within auxiliary housing 66 through the rear wall into engagement with lateral portions of clamping plate 58. Cams 68 are designed to move pins 70 inwardly when the cutter bar is moved to open position and to allow the outward movement of the pins when the cutter bar is pivoted into its closed position. By virtue of this construction, the clamping plate is, of necessity, moved into proper position at the proper time; and this is accomplished by the necessary movement of the cutter bar.

The camera includes means permitting the introduction of container 42 into the camera so that the container is located adjacent hinge 40 and the image-recording and carrier sheets at the bite of rolls 48 and 50 and for compressing the container as the latter is withdrawn from the camera transversely of the sheets. In the form shown in detail in FIGS. 5 through 8, these means comprise a circular opening 72 in one of side walls 18 designed to receive container 42. Opening 72 is so located that a container 42, introduced through the opening, will be disposed closely adjacent the sheets at the bite of the rolls while little or no light is allowed to enter the housing around the container. Mounted on wall 18 to the rear of opening 72 is a backing member 74 having a support surface 76 facing the wall of the camera and inclined inwardly and rearwardly to a position displaced rearwardly from the opening by a distance at least equal to the thickness of the flattened container. A compression member 78 is provided mounted for pivotal movement inwardly and forwardly from a closed position shown in FIG. 7 in which the compression member extends rearwardly across and in closing relation to opening 72 to an open position shown in FIG. 5. Compression member 78 is urged into its closed position by a spring which has sufficient strength to retain the compression member in closed position while permitting the compression member to be pivoted to its open position in response to the introduction of a container into the opening. Compression member 78 includes an end section having an end surface 80 which, in the closed position of the compression member, is located substantially parallel with support surface 76 and is spaced therefrom by a distance approximately equal to the thickness of the flattened container. By virtue of this construction, the container is movable in a flattened condition between the end surface of the compression member and the support surface of the backing member with the compression member in its closed position, yet light is prevented from entering the camera housing through opening 72 and between the compression member and the backing member when the compression member is in its closed position. Inclining support surface 76 and end surface 80 rearwardly and inwardly serves another function during withdrawal of the container between the compression member and the backing member. This is to urge the container rearwardly into contact with the sheets at the bite of the rolls so that contact between the liquid as it is discharged from the trailing end of the container is assured since the trailing end of the container will contact the sheets during withdrawal movement.

Since the container is formed of a material which is both air and water impervious and tends to return to its original cross sectional configuration following flattening of the container, there is a tendency for some liquid to remain in the container as the container is compressed progressively to eject its fluid contents. It has been discovered that a more complete ejection of the fluid contents of the container with far greater ease is possible if the container is punctured adjacent the leading end of the fluid-filled cavity in order to admit air into the container and facilitate the collapse of the container and the complete discharge of its contents due to application of compressive pressure by compression member 78. Means are provided on the compression member for puncturing the container during the initial portion of the withdrawal movement of the container; and, in the form shown in FIG. 8, these means comprise a puncturing element or pin 82 mounted on the outer surface of compression member 78 and having an end section 84 tapering to a point, and in the closed position of compression member 78, extending outwardly and toward support surface 76 of backing member 74. End section 84 terminates at a point spaced from support surface 76 and the adjacent surface of the wall of opening 72 by a distance slightly greater than the thickness of the flattened container so that puncturing element 82 will not interfere with the withdrawal movement of the flattened container through opening 72 when compression member 78 is in closed position. In the open position of compression member 78 shown in FIG. 5, puncturing element 82 rests on the leading end portion of the fluid-filled cavity of the container at a position intermediate the flattened leading end of the container and the fully extended portion of the fluid-filled cavity with the tapered end section 84 of element 82 projecting rearwardly toward the container wall. Then as withdrawal movement of the container is initiated as shown in FIG. 6, puncturing element 82 is engaged by the container pivoting compression member 78 into closed position while the puncturing element perforates the wall of the container forming an opening therein through which air may be admitted to facilitate complete ejection of the fluid contents of the container.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for exposing and processing a succession of photosensitive image-recording sheets pivotally secured to a second sheet at the leading edges of said image-recording sheets, said apparatus comprising, in combination:

- a housing for holding a plurality of said image-recording sheets coiled together with said second sheet with the photosensitive surfaces of said image-recording sheets facing inwardly and said leading edges located toward the trailing end of said second sheet;
- said housing being provided with an opening through which said sheets are movable;
- a pair of juxtaposed members mounted within said housing adjacent said opening for superposing said photosensitive surface of each of said image-recording sheets with said second sheet and distributing a liquid-processing composition between the superposed sheets during withdrawal movement thereof between said members through said opening;
- said housing including a wall providing a support surface for locating each of said image-recording sheets in position for exposure, said support surface having an edge located adjacent one of said juxtaposed members;
- exposure means for transmitting actinic radiation to an image-recording sheet positioned for exposure on said support surface with said photosensitive surface of said image-recording sheet facing said exposure means;
- a retaining plate transmissive to actinic radiation and at least coextensive with each of said image-recording sheets positioned adjacent said support surface between the latter and said exposure means;
- means mounting said retaining plate for movement toward and away from said support surface;
- means for guiding the trailing edge of said image-recording sheets between said support surface and said retaining plate during withdrawal movement of said second sheet between said juxtaposed members; and
- control means coupled with said retaining plate for moving said plate toward said support surface to clamp one of said image-recording sheets between said plate and surface in position for exposure upon movement of said one image-recording sheet between said support surface and retaining plate;
- said control means including means engageable exterior of said housing for spacing said retaining plate away from said support surface to permit withdrawal movement of said one image-recording sheet and the movement of the next succeeding image-recording sheet into position for exposure between said support surface and said retaining plate.

2. The photographic apparatus of claim 1 in which the last-mentioned means comprise:

- a control member mounted for movement on the exterior of said housing between a first position in which said member extends across said opening, closing said opening and aiding in the severance of a portion of said second sheet extending through said opening, and a second position to one side of said opening permitting withdrawal movement of said sheets through said opening;
- said control member being coupled with said retaining plate for spacing said plate apart from said support surface when said control member is moved into said second position.

3. The photographic apparatus of claim 1 in which said exposure means comprise:

- an optical system for producing an image at least coextensive with each of said image-recording sheets;
- said support surface is located approximately at the image surface of said system; and
- said retaining plate is transparent and has substantially parallel surfaces conforming to said support surface.

4. Photographic apparatus for exposing and processing a succession of photosensitive image-recording sheets pivotally secured to a second sheet at the leading edges of said image-recording sheets, said apparatus comprising, in combination:

- a housing for holding a plurality of said image-recording sheets coiled together with said second sheet with the photosensitive surfaces of said image-recording sheets facing inwardly and said leading edges located toward the trailing end of said second sheet;
- said housing being provided with an opening through which said sheets are movable;
- a pair of juxtaposed members mounted within said housing adjacent said opening for superposing said photosensitive surface of each of said image-recording sheets with said second sheet and distributing a liquid-processing composition between the superposed sheets during withdrawal movement thereof between said members through said opening;
- said housing includingg a wall providing a support surface for locating each of said image-recording sheets in position for exposure, said support surface having an edge located adjacent one of said juxtaposed members;
- exposure means for transmitting actinic radiation to an image-recording sheet positioned for exposure on said support surface with said photosensitive surface of said image-recording sheet facing said exposure means;
- a retaining plate transmissive to actinic radiation and at least coextensive with each of said image-recording sheets positioned adjacent said support surface between the latter and said exposure means;
- means mounting said retaining plate for movement toward and away from said support surface;
- means for guiding the trailing edge of each of said image-recording sheets between said support surface and said retaining plate during withdrawal movement of said second sheet between said juxtaposed members; and
- control means coupled with said retaining plate and engageable exterior of said housing for moving said plate toward and away from said support surface to clamp one of said image-recording sheets therebetween in position for exposure, and spacing said plate away from said support surface to permit withdrawal of said image-recording sheet and simultaneous movement of the next succeeding image-recording sheet into position for exposure between said support surface and said retaining plate.

5. Photographic apparatus for exposing and processing a succession of photosensitive image-recording sheets pivotally secured to a second sheet at the leading edges of said image-recording sheets, said apparatus comprising, in combination:

- a housing for holding a plurality of said image-recording sheets coiled together with said second sheet with the photosensitive surfaces of said image-recording sheets facing inwardly and said leading edges located toward the trailing end of said second sheet;

said housing being provided with an opening through which said sheets are movable;

a pair of juxtaposed members mounted within said housing adjacent said opening for superposing said photosensitive surface of each of said image-recording sheets with said second sheet and distributing a liquid processing composition between the superposed sheets during withdrawal movement thereof between said members through said opening;

said housing including a wall providing a support surface for locating each of said image-recording sheets in position for exposure, said support surface having an edge located adjacent one of said juxtaposed members;

exposure means for transmitting actinic radiation to an image-recording sheet positioned for exposure on said support surface with said photosensitive surface of said image-recording sheet facing said exposure means;

a retaining plate transmissive to actinic radiation and at least coextensive with each of said image-recording sheets positioned adjacent said support surface between the latter and said exposure means;

means mounting said retaining plate for movement toward and away from said support surface;

means for guiding the trailing edge of each of said image-recording sheets between said support surface and said retaining plate during withdrawal movement of said second sheet between said juxtaposed members; and a control member mounted on the exterior of said housing for movement between a first position in which said member extends across said opening, closing said opening and cooperates with said housing to sever a portion of said second sheet extending through said opening, and a second position to one side of said opening permitting withdrawal of said sheets through said opening;

said control member being coupled with said retaining plate for spacing said plate apart from said support surface during movement of said control member from said first to said second position and moving said plate toward said support during movement of said control member from said second to said first position.

6. The photographic apparatus of claim 1 in which said control means includes a cutting edge at least equal in length to the width of said second sheet and, in said first position, clamps a section of said second sheet against said housing adjacent said opening to permit the remainder of said second sheet to be severed by tearing against said cutting edge.

7. The photographic apparatus of claim 5 in which said retaining plate is pivotable about its end furthest from said juxtaposed members and said control member includes means for pivoting said retaining plate.

8. The photographic apparatus of claim 5 in which said exposure means comprise an optical system for producing an image approximately at said support surface at least coextensive with each of said image-recording sheets; and said retaining plate is transparent and has substantially parallel surfaces conforming substantially to said support surface.

No references cited.